July 24, 1951  J. H. RAMSEY ET AL  2,561,820
PROCESS OF AND APPARATUS FOR VULCANIZATION
Filed March 12, 1949  3 Sheets-Sheet 2
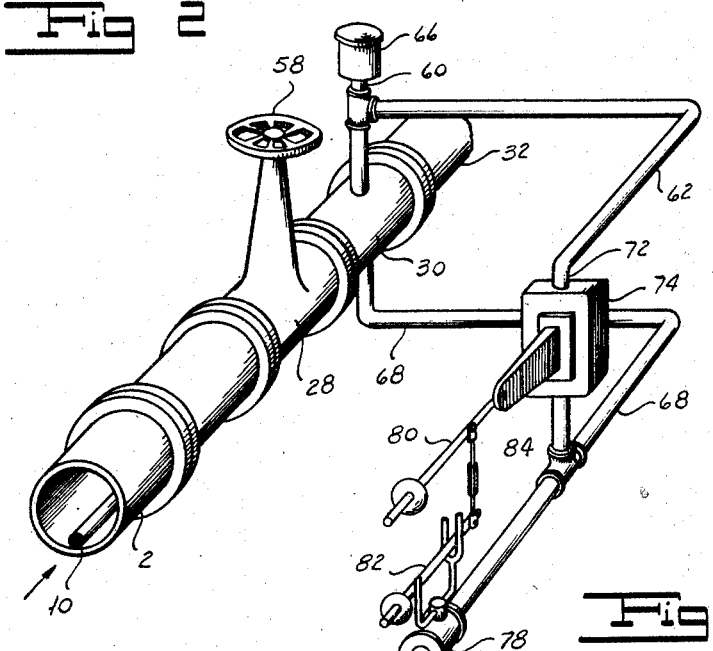
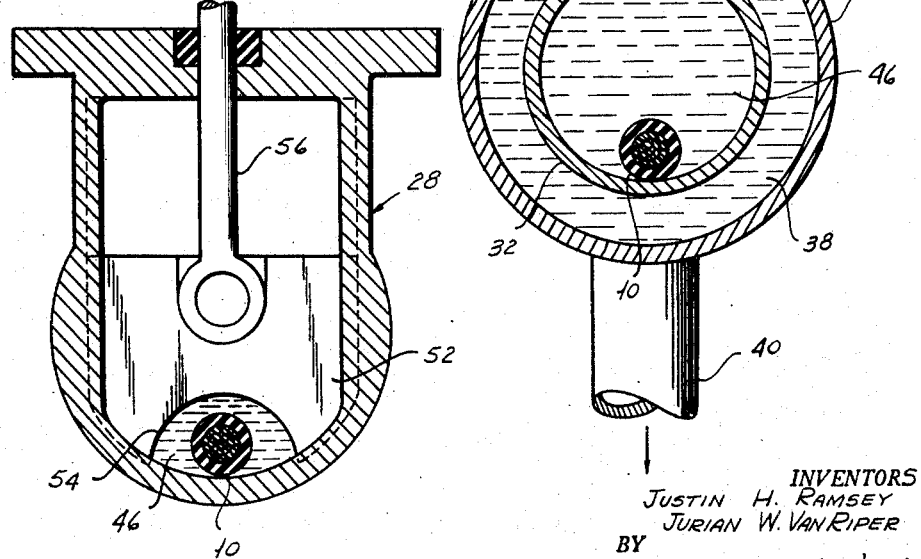
INVENTORS
JUSTIN H. RAMSEY
JURIAN W. VAN RIPER
BY
Alfred W. Vibber
ATTORNEY July 24, 1951 J. H. RAMSEY ET AL 2,561,820
PROCESS OF AND APPARATUS FOR VULCANIZATION
Filed March 12, 1949 3 Sheets-Sheet 3
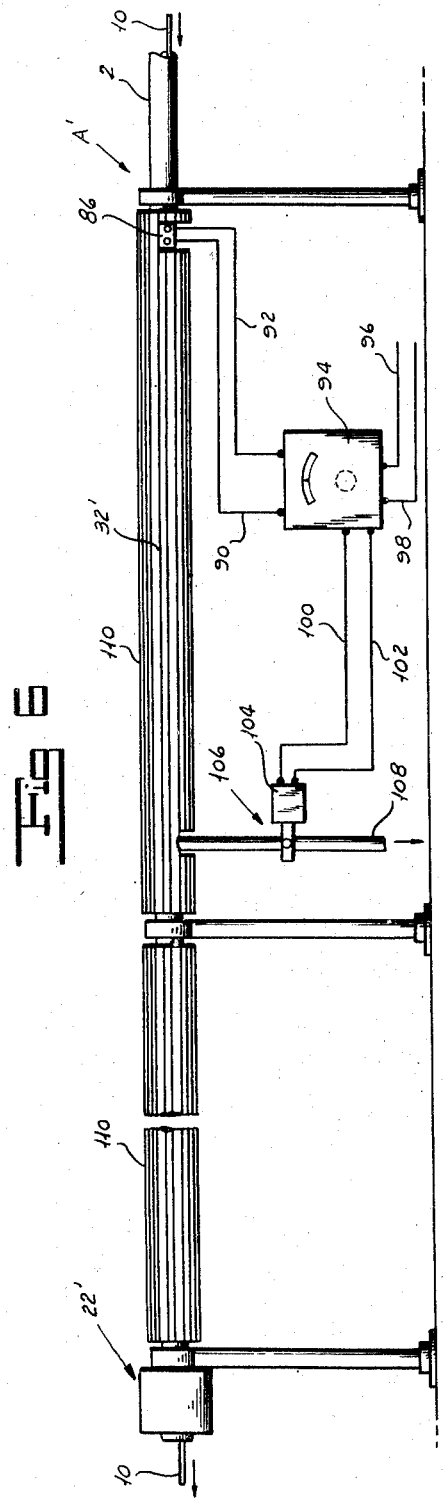
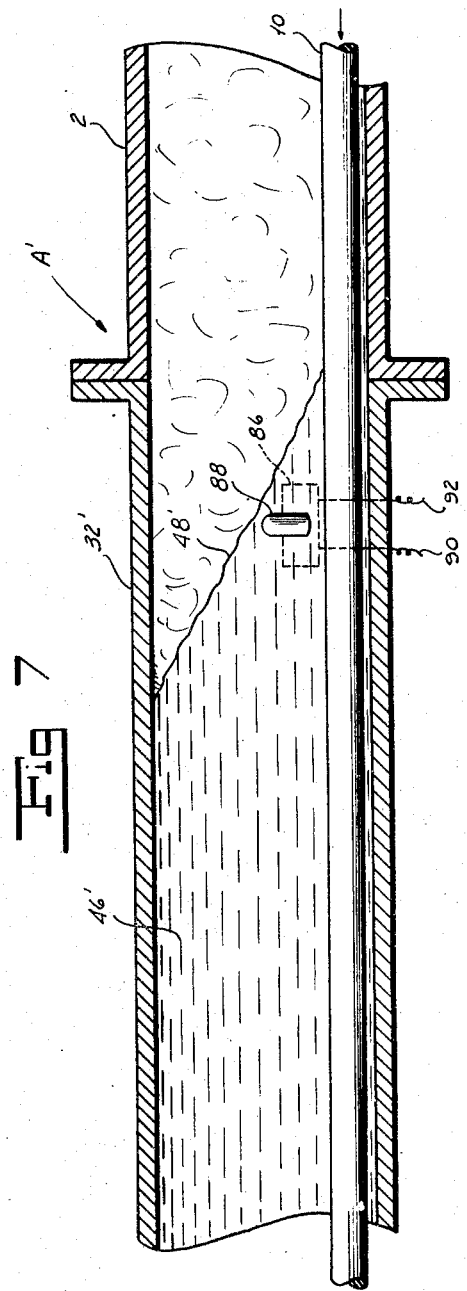
INVENTORS
JUSTIN H. RAMSEY
JURIAN W. VAN RIPER
BY
Alfred W. Vibber
ATTORNEY Patented July 24, 1951

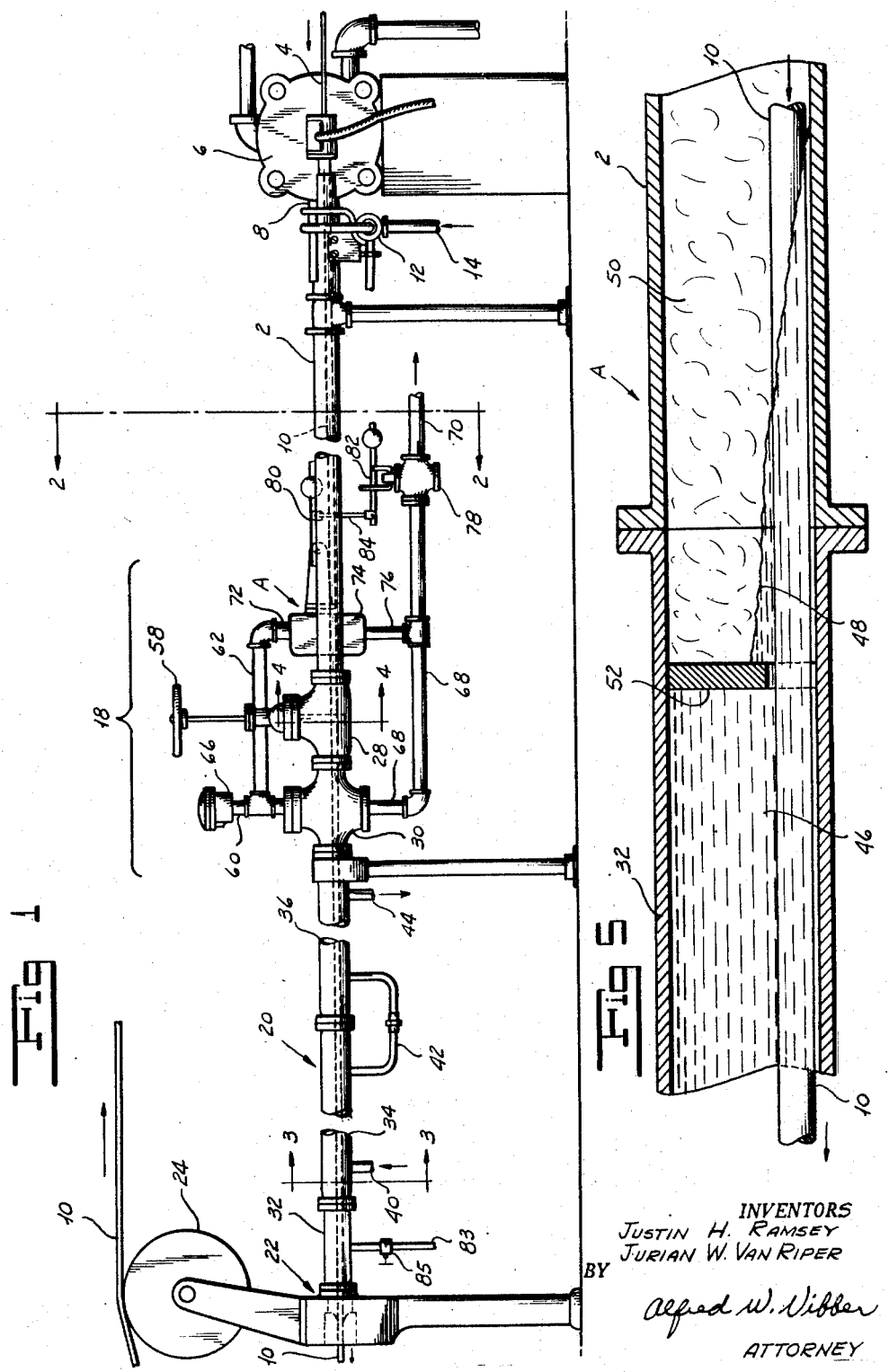

2,561,820

UNITED STATES PATENT OFFICE 2,561,820

PROCESS OF AND APPARATUS FOR VULCANIZATION

Justin H. Ramsey, Allendale, and Juran W. Van Riper, Fairlawn, N. J.

Application March 12, 1949, Serial No. 81,074

22 Claims. (Cl. 18—6)

This invention relates to a process of and in apparatus for continuously vulcanizing extruded products such as the sheaths on electrical conductors.

In the formation of electrically insulated sheathed conductors it is now conventional to sheath the conductor with a vulcanizable elastomeric material such as rubber or synthetic rubber by passing the conductor core continuously into an extrusion head, following which the sheathed conductor immediately enters an elongated vulcanizing chamber in which it is subjected to steam under high pressure. The length of travel of the sheathed conductor in the vulcanizing chamber, its speed of travel, and the temperature to which it is subjected, are so correlated that when the sheathed conductor issues from the exit end of the vulcanizing chamber the sheath thereon is fully vulcanized. Such vulcanized sheath, however, although fully vulcanized, is at a high temperature when it issues from the vulcanizing chamber and thus it is prone to injury by contact with the cable traversing means. Furthermore, the high temperature to which the sheathed cable is subjected during vulcanization causes various impurities and foreign materials contained internally of the sheath to become vaporized and to exert appreciable pressures within the sheath. It has thus been proposed to cool the vulcanized sheath to such a temperature that it has sufficient strength to resist the internal pressures developed within the sheath. Such cooling of the conductor also, of course, has the further effect of reducing the internal pressures within the sheath and thus further overcoming the tendency of the sheath to blister.

Proposals in the prior art to overcome such blistering of the vulcanized conductor sheath have included the provision of a separate elongated cooling chamber separately supplied with cooling water, such cooling chamber receiving the vulcanized conductor immediately upon the issuance of the latter from the vulcanizing chamber. In such prior proposal the cooling chamber is maintained at a pressure usually somewhat less than, but on the same order as, the pressure within the vulcanizing chamber. Such apparatus, although successful in producing a blister-free vulcanized cable, is disadvantageous since it keeps the two sealing means in the vulcanizing chamber and adds thereto a third, that is, the one at the exit end of the cooling chamber. Furthermore, such apparatus requires a separate source of cooling fluid, water, for example, under high pressure and thus requires the provision of a high pressure pumping system. In addition to the cost of such high pressure fluid system such apparatus entails an appreciable maintenance cost, since the cooling fluid, coming directly into contact with the vulcanized rubber, becomes charged with a relatively high sulphur content. Such sulphur, of course, being highly corrosive in action, soon fouls the cooling system, thereby requiring constant maintenance of such system. The maintenance problem is particularly acute where the cooling fluid is recirculated, the sulphur content thus tending constantly to increase in the coolant.

It is, accordingly, an object of the invention to provide an improved, simplified, apparatus for the continuous vulcanization and cooling of sheathed conductors and the like, such apparatus eliminating the seal at the end of the vulcanizing chamber.

It is a further object of the invention to provide an apparatus of the indicated character, such apparatus providing means for cooling the vulcanized conductor by contact between such conductor and the condensate from the steam in the vulcanizing chamber, such condensate being maintained at a predetermined level and in a zone of predetermined length in the cooling chamber.

The invention has, as still a further object thereof, the provision of an apparatus whereby the necessity for a high pressure coolant supply is eliminated, the cooling system being simplified and maintenance problems being greatly reduced.

Yet another object of the invention resides in the provision of a method of continuously vulcanizing sheathed conductors and cooling them wherein the coolant employed in direct contact with the vulcanized conductor is condensate from the vulcanizing chamber.

These and further objects of the invention will be more readily apparent upon the consideration of the following specification. In the drawings which form a part of the specification:

Fig. 1 is a view in side elevation of a first embodiment of the apparatus of the invention, the apparatus being shortened in actual extent by omission of portions of the vulcanizing chamber and also of the cooling chamber;

Fig. 2 is a somewhat schematic view in perspective of that portion of the mechanism shown in Fig. 1 which maintains the condensate within a predetermined zone in the cooling chamber;

Fig. 3 is a view in vertical transverse section through the cooling chamber, the section being taken along the line 3—3 in Fig. 1;

Fig. 4 is a view in transverse vertical section through the apparatus for controlling the volume of the condensate, the section being taken along the line 4—4 in Fig. 1;

Fig. 5 is a schematic view in longitudinal vertical section through the vulcanizing and cooling apparatus, the view being taken at the zone A, that is, the boundary between the steam in the vulcanizing chamber and the condensate in the cooling chamber;

Fig. 6 is a somewhat schematic, broken, view in side elevation of a second embodiment of the vulcanizing apparatus of the invention; and Fig. 7 is a view in longitudinal axial section through the apparatus shown in Fig. 6, the view being taken in the vicinity of the zone A' at the boundary between the steam in the vulcanizing chamber and the condensate in the cooling chamber.

The vulcanizing chamber 2, as shown in Figs. 1 and 2, consists of a pipe disposed horizontally, such pipe providing within it a cavity 50 through which the sheathed product travels. Ordinarily chamber 2 will have a steam jacket disposed about it throughout its length, but for simplicity of illustration such steam jacket is omitted. Chamber 2, in a typical installation, will have a length on the order of 175 feet. To the forward end of the chamber 2 there is connected the apparatus by means of which the conductor is sheathed and fed into the chamber. As shown, conductor 4 is introduced in a direction from right to left in Fig. 1 through the die box of the extruding apparatus 6 from which it emerges as a sheathed conductor 10. The conductor then travels through the connecting means between the extruding head and the vulcanizing chamber. In the connecting means 8 between the extruder and the vulcanizing chamber there is incorporated a valve means 12 through which, by means of inlet pipe 14, the vulcanizing steam is introduced to the vulcanizing chamber. In a typical installation such steam will be at a pressure of from 200 to 250 lbs. per square inch.

The sheathed conductor 10 travels through the chamber 2 and into the cooling chamber which begins roughly in a zone designated A. In the apparatus of the invention no sealing means is employed between the exit end of the vulcanizing chamber and the inlet end of the cooling chamber, the two chambers being directly connected, as shown in Fig. 5. The sheathed conductor thus travels directly into and through the pipe 32 constituting the inner container of the cooling chamber, and through the exit seal shown generally at 22 in Fig. 1 at the end of the cooling chamber, from which the vulcanized cooled conductor emerges into the atmosphere. The conductor is then fed rearwardly to a conductor traversing and take-up means, not shown, over sheave 24.

The cooling chamber of the apparatus, that is, that portion of the chamber from the zone A to the seal 22, will, in a typical installation, have a length on the order of 30 feet. Such portion of the chamber, as is indicated in Fig. 5, during normal and continuous operation of the apparatus, is filled with condensate from the steam in the vulcanizing chamber 2. The condensate, designated 46, fills the left-hand end of the chamber by reason of the fact that the travel of the steam in the vulcanizing chamber is, as indicated, in a direction from right to left. Furthermore, the direction of travel of the sheathed conductor 10, which may travel at speeds up to 1000 feet per minute, is in the same direction. The conductor thus acts as a pump, constantly impelling condensate toward the exit end of the cooling chamber. These two factors, the direction of travel of the steam and of the conductor, cause condensate from the steam to travel into the left-hand end of the chamber and to remain there. There is a fairly definite boundary between the condensate in the cooling chamber and the steam in the cavity 50 of the vulcanizing chamber 2.

In the first embodiment of the invention, shown in Figs. 1, 2, 3, and 4, control apparatus, generally designated 18, is provided for maintaining the steam-condensate boundary within predetermined limits within the longitudinal extent of the cooling chamber at the zone A. Mechanism 18 includes a level control unit 74 so connected to the cooling chamber that the level of fluid within unit 74 is responsive to the longitudinal position of the boundary between condensate and steam in such chamber and, accordingly, to the volume of condensate within the cooling chamber.

Apparatus 18 has two serially connected fittings 28 and 30 which form the entrance end of the cooling chamber. Fitting 28 is generally in the form of a gate valve and fitting 30 is in the form of a crossover. The gate 52 of the modified gate valve 28 has, in its bottom portion, an arcuate recess 54, the recess being of such height and breadth that when the gate 52 is advanced to its lowermost position the recess accommodates the sheathed cable 10 therethrough without scraping it. Gate 52 constitutes a partial barrier between the vulcanizing zone and the cooling zone of the apparatus, such partial barrier being imperforate over the major portion of its area and at the top thereof. As is shown in Fig. 4, recess 54 does not conform exactly to the shape of the cable. The spaces at the sides and top of the sheathed conductor 10 through the cut-out 54 provides substantial communication between the forward and rear portions of the cooling chamber, whereby all portions of such cooling chamber are subjected to the same pressure as that prevailing in the vulcanizing chamber.

When the apparatus is being initially threaded, the gate 52 is moved upwardly by means of the valve handle 58 acting through the valve stem 56, so that the gate is removed from the bottom of the valve and the sheathed conductor may be thrust readily therebelow. After the apparatus has been threaded, the gate 52 is usually advanced to its lowermost position, as shown, such gate being of value in tending to minimize the surges of fluid longitudinally of the system, and to maintain the cooling chamber to the left of the gate full of condensate. In some instances, however, when surging of the condensate is not troublesome, it may be desired to leave the gate 52 in its upper position during operation of the apparatus, since there is a fairly definite boundary between the steam and the condensate even in the absence of the gate.

The condensate control system 18 includes pipe 60 connected to the top of the fitting 30, the cross pipe 62, and the vertical pipe 72 which is connected, as shown, to the top of level control unit 74. Such pipe system is vented of air by means of the thermostatically operated trap 66. Means selectively to exhaust condensate from the cooling chamber is provided in the form of the pipe 68 connected to the bottom of fitting 30, pipe 68 being provided in its forward end with the selectively operable exhaust valve 78, the pipe 70 from such valve leading to an exhaust sump, not shown. The level control unit 74 is connected at its bottom end to pipe 68 by pipe 76. Unit 74 may be a commercially available unit such as the Kieley and Mueller type 260 level control unit. Such valve is shown in Figs. 1 and 2 located so that its horizontal center line lies about level with the inner top surfaces of the vulcanizing and cooling chambers which, as shown, lie horizontal. The connections between the various pipes and units of control 18 will be more readily understood by a consideration of the schematic view in Fig. 2.

It will be apparent that the unit 74 functions as a sight glass insofar as registering the level of condensate at fitting 30 is concerned. When the cooling chamber at fitting 30 is full of condensate, the liquid level in unit 74 is at or above the vertical mid-point of such unit. When fitting 30 is not full of condensate, the level of liquid in unit 74 will drop below the vertical mid-point thereof.

The operating lever 80 of unit 74 is so connected to the float of the unit that when the liquid level in the unit is down the lever remains in the position shown in Fig. 1 but that when the liquid level in unit 74 rises past a predetermined point the lever 80 rotates counterclockwise, thereby operating the lever 82 of the exhaust valve 78 to open such valve to exhaust condensate through the sump. The connection between lever 80 and lever 82 is effected by the adjustable connecting linkage 84. The unit 18, therefore, functions automatically to maintain the cooling chamber to the left of gate 52 full of water, as shown in Fig. 5. Normally some condensate will extend to the right of the gate, having a boundary 48 as shown in Fig. 5, but such volume is small, due to the forces acting upon the condensate which urge it constantly to the left.

The condensate within the tube 32 of the cooling chamber is cooled by means of the jacket members 34 and 36. Member 34 is shown in Fig. 3 as surrounding tube 32 so as to form a chamber 38 between such two tubes. The cooling jackets 34 and 36 will preferably extend throughout the major portion of the length of the cooling chamber. Cooling jacket 34 is fed through entrance pipe 40, the two jackets being connected by the pipe 42. Cooling fluid flows out of jacket 36 through the exit pipe 44. Because the cooling jackets are entirely disconnected from the cooling chamber containing the sheathed conductor, the coolant employed in the jackets 34 and 36 may be ordinary tap water presented to the jackets under ordinary hydrant pressures. The apparatus of the invention, therefore, does not require the use of a high pressure coolant supplying system.

In initially preparing the apparatus, the sheathed conductor is, of course, first threaded through the continuous vulcanizing chamber and through the cooling chamber formed as a prolongation thereof, the gate 52 being in raised position to facilitate such threading operation. When the apparatus is first placed in operation after the cooling chamber 32 has been allowed to become empty of liquid, an appreciable quantity of tap water is introduced into the chamber from the pipe 83 through the shut-off valve 85. Such valve is then closed and is not used again during continuous operation of the apparatus, since more than sufficient cooling fluid is derived from the condensate of the steam in the vulcanizing chamber during continued operation of the device. The gate 52 may then be lowered to the position shown in Fig. 4. Steam is then gradually introduced into the vulcanizing chamber through the pipe 14, the initial charge of water through pipe 83 being driven by the steam into the cooling chamber. By proper manipulation of the controls the cooling chamber will have enough water fed into it so that a stable operating condition, with the boundary between the condensate and the steam in the chamber positioned in the neighborhood of zone A, may readily be obtained. Thereafter, as mentioned, the apparatus 18 will function to maintain the condensate in the cooling chamber within a predetermined range of volume and thus the boundary in a predetermined position longitudinally of the chamber.

The condensate 46 which is intermittently discharged from the cooling chamber is, of course, the liquid which is in direct contact with the vulcanized sheathed cable. Owing to the sulphur content of the rubber sheath, considerable sulphur is discharged into such condensate. Because of the repeated discharge of the condensate, however, the sulphur content does not build up in the liquid in the cooling chamber, but is held at a fairly low percentage in the condensate. Consequently, corrosion of the interior of the cooling chamber by such sulphur is minimized and, in any event, only simple non-moving parts are in contact with such sulphur laden water rather than pumps and the like in the high pressure liquid supplying system necessitated by the prior art apparatus above discussed. The apparatus of the invention is, of course, further advantageous since there is employed no seal between the exit end of the vulcanizing device and the entering end of the cooling chamber. Thus the maintenance of such intermediate seal, which receives by far the hardest service in vulcanizing apparatus of this sort, is obviated. In addition the vulcanized, but very soft, sheathed conductor is not subjected to the scraping action of any such seal in its passage from the vulcanizing chamber to the cooling chamber.

In Figures 6 and 7 there is shown an alternative embodiment of vulcanizing and cooling apparatus made in accordance with the present invention. In Fig. 6 there is shown, somewhat schematically, the exit end of the continuous vulcanizing chamber 2 through which the sheathed conductor 10 travels. To the exit end of chamber 2 there is directly connected the elongated cooling chamber 32' which forms a prolongation of the vulcanizing chamber. Cooling chamber 32' is provided at its left-hand end, as shown in Fig. 6, with an exit seal 22' from which issues the vulcanized cooled sheathed conductor 10. Cooling chamber 32' is shown, in this instance, as having external fins 110 for the dissipation of heat from the chamber to the atmosphere. Such construction is feasible when chamber 32' may be made on the order of fifty feet or more in length, the exchange of heat between the fins on the outer surface of the pipe constituting chamber 32' and the atmosphere being sufficient to cool the condensate therein to an extent such that the sheathed conductor issuing from seal 22' is cooled sufficiently so as not to blister.

The means for maintaining the volume of condensate 46' within predetermined desired limits in the cooling chamber, and thus for maintaining the boundary face 48' at the desired zone longitudinally of the chamber, takes the form of a thermocouple controlled exhaust valve. A thermocouple, generally designated 86, has an internally projecting thermo-responsive unit 88 screwed through the sidewall of the cooling chamber at zone A' in a position above the bottom of the chamber so as not to interfere with the passage of conductor 10, as shown in Fig. 7. Unit 88 is of such length, is so located relative to the length of chamber 32', and is of such construction, that the current generated by it differs markedly when it is covered or substantially covered by the condensate, as shown in Fig. 7, from that which it generates when the unit 88 is directly exposed to the steam in the vulcanizing chamber 2. Unit 88 will naturally be markedly hotter when it is in direct contact with the vulcanizing steam than when it is completely covered or substantially covered by the condensate, as shown.

Leads 90 and 92 from thermocouple 86 are led to the adjustable control thermometer device 94, which is supplied with actuating current for the valve to be described through the leads 96 and 98. Unit 94 incorporates a relay device, not shown, such relay device being responsive to control by unit 86. Current from leads 96 and 98, as controlled by the interposed relay, is led from unit 94 through the leads 100 and 102 to the operating solenoid 104 of the electromagnetically operated exhaust valve 106 located in exhaust pipe 108 from chamber 32'.

It will be understood that, when the apparatus has reached stable operating conditions in which the boundary 48' between the condensate 46' and the steam in chamber 2 lies at a position near or at zone A', the control mechanism above described will automatically maintain the volume of condensate such that the boundary 48' will be maintained within predetermined limits of travel longitudinally of the cooling chamber 32'. Thus, with the control thermometer 94 set at an appropriate temperature when unit 88 rises above such predetermined temperature valve 106 will be closed, thereby to build up the volume of condensate in chamber 32' until unit 88, in the main, is covered. When unit 88 is thus covered, it will operate solenoid 104 of valve 106 to open the valve and to exhaust condensate from chamber 32'. Valve 106 remains open until unit 88 is again predominantly uncovered, after which valve 106 is automatically closed. Such operations are automatically continued during the operation of the apparatus.

It will be apparent that the apparatus shown in Figs. 6 and 7 has the same advantages over the prior art as does that in the first described embodiment, that is, it eliminates the necessity of a seal between the vulcanizing chamber and the cooling chamber, it obviates the provision of a separate high pressure liquid coolant supplying means for the cooling chamber, and because it periodically discharges and does not recirculate the cooling liquid immediately in contact with the vulcanized sheath it markedly reduces corrosion problems in the cooling chamber.

Although for purposes of illustration we have shown and described preferred embodiments of the process for and apparatus for vulcanization, it is to be understood that the invention is not limited thereto since it is capable of considerable variation as to details. The invention is, therefore, defined by the scope of the claims appended hereto.

We claim as new the following:

1. The process for the continuous vulcanization of elongated vulcanizable material which comprises passing such material continuously through a vulcanizing zone, subjecting the material to contact with steam under pressure while passing through the vulcanizing zone to vulcanize the material, passing the material continuously and directly from the vulcanizing zone to a cooling zone, and immersing the vulcanized material in a liquid which consists predominantly of condensate, said liquid being maintained under pressure in the cooling zone, said condensate being derived during operation of the process from the steam in the vulcanizing zone.

2. The process for the continuous vulcanization of elongated vulcanizable material which comprises passing such material continuously through a vulcanizing zone, subjecting the material to contact with steam under pressure while passing through the vulcanizing zone to vulcanize the material, passing the material continuously and directly from the vulcanizing zone to a cooling zone, and immersing the vulcanized material in a liquid which consists predominantly of condensate in the cooling zone, said condensate being derived during operation of the process from the steam in the vulcanizing zone, the condensate in the cooling zone being in direct communication with, and at the same pressure as, the steam in the vulcanizing zone.

3. The process for the continuous vulcanization of elongated vulcanizable material which comprises passing such material continuously through a vulcanizing zone, subjecting the material to contact with steam at high pressure while passing through the vulcanizing zone to vulcanize the material, passing the material continuously and directly from the vulcanizing zone to a cooling zone, immersing the vulcanized material solely in condensate in the cooling zone, said condensate being derived during operation of the process from the steam in the vulcanizing zone, the condensate in the cooling zone being in direct communication with, and at the same pressure as, the steam in the vulcanizing zone.

4. The process for the continuous vulcanization of elongated vulcanizable material which comprises passing such material continuously through a vulcanizing zone, subjecting the material to contact with steam at high pressure while passing through the vulcanizing zone to vulcanize the material, passing the material continuously and directly from the vulcanizing zone to a cooling zone, the material traveling in substantially a straight line through the vulcanizing and cooling zones, and immersing the vulcanized material solely in condensate in the cooling zone, said condensate being derived during operation of the process from the steam in the vulcanizing zone, the condensate in the cooling zone being in direct communication with, and at the same pressure as, the steam in the vulcanizing zone.

5. The process for the continuous vulcanization of electrical conductors insulated with vulcanizable insulating material which comprises passing such conductor continuously through an elongated chamber, passing such conductor through a vulcanizing zone maintained in the chamber, subjecting the conductor to contact with steam at high pressure while passing through the vulcanizing zone to vulcanize the insulating material, passing the conductor continuously and directly from the vulcanizing zone to a cooling zone maintained in the chamber, the conductor traveling in substantially a straight line through the vulcanizing and cooling zones, immersing the vulcanized conductor in liquid in the cooling zone, said liquid being predominantly condensate derived during operation of the process from the steam in the vulcanizing zone, the liquid in the cooling zone being in direct communication along the path of travel of the conductor with, and at the same pressure as, the steam in the vulcanizing zone, abstracting heat from the liquid in the cooling zone by circulating cooling fluid isolated from but in heat exchanging relationship with the condensate in the cooling zone.

6. The process for the continuous vulcanization of electrical conductors insulated with vulcanizable insulating material which comprises passing such conductor continuously through an elongated chamber, passing such conductor through an elongated vulcanizing zone maintained in the chamber, subjecting the conductor to contact with steam at high pressure while passing through the vulcanizing zone to vulcanize the insulating material, passing the conductor continuously and directly from the vulcanizing zone to an elongated cooling zone maintained in the chamber, the cooling zone having a length which is a substantial part of the length of the vulcanizing zone, the conductor traveling in substantially a straight line through the vulcanizing and cooling zones, immersing the vulcanized conductor solely in condensate in the cooling zone, said condensate being derived during operation of the process from the steam in the vulcanizing zone, the condensate in the cooling zone being in direct communication with, and at the same pressure as, the steam in the vulcanizing zone, abstracting heat from the condensate in the cooling zone by circulating cooling fluid isolated from but in heat exchanging relationship with the condensate in the cooling zone, and discharging the cooled conductor from the cooling zone into a zone at atmospheric pressure.

7. The process for the continuous vulcanization of electrical conductors insulated with vulcanizable insulating material which comprises passing such conductor continuously through an elongated chamber, passing such conductor through an elongated vulcanizing zone maintained in the chamber, subjecting the conductor to contact with steam at high pressure while passing through the vulcanizing zone to vulcanize the insulating material, passing the conductor continuously and directly from the vulcanizing zone to an elongated cooling zone maintained in the chamber, the cooling zone having a length which is a substantial part of the length of the vulcanizing zone, the conductor traveling in substantially a straight line through the vulcanizing and cooling zones, immersing the vulcanized conductor solely in condensate in the cooling zone, said condensate being derived during operation of the process from the steam in the vulcanizing zone, the condensate in the cooling zone being in direct communication with, and at the same pressure as, the steam in the vulcanizing zone, abstracting heat from the condensate in the cooling zone by circulating cooling fluid isolated from but in heat exchanging relationship with the condensate at the cooling zone, periodically discharging sufficient condensate from the cooling zone to maintain the condensate generally within a predetermined length of the chamber at the cooling zone, and discharging the cooled conductor from the cooling zone into a zone at atmospheric pressure.

8. The process for the continuous vulcanization of electrical conductors insulated with rubber-like insulating material which comprises passing such conductor continuously through an elongated chamber, passing such conductor through an elongated vulcanizing zone maintained in the chamber, subjecting the conductor to contact with steam at a pressure on the order of 200 lbs. per square inch while passing through the vulcanizing zone to vulcanize the insulating material, passing the conductor continuously and directly from the vulcanizing zone to an elongated cooling zone maintained in the chamber, the cooling zone having a length which is a substantial part of the length of the vulcanizing zone, the conductor traveling in substantially a straight line through the vulcanizing and cooling zones, immersing the vulcanized conductor solely in condensate in the cooling zone, said condensate being derived during operation of the process from the steam in the vulcanizing zone, the condensate in the cooling zone being in direct communication along the path of travel of the conductor with, and at the same pressure as, the steam in the vulcanizing zone, abstracting heat from the condensate in the cooling zone by circulating cooling fluid isolated from but in heat exchanging relationship with the condensate at the cooling zone, periodically discharging sufficient condensate from the cooling zone to maintain the condensate generally within a predetermined length of the chamber at the cooling zone, and discharging the cooled conductor from the cooling zone into a zone at atmospheric pressure.

9. Apparatus for the continuous vulcanization of elongated vulcanizable material, comprising an elongated chamber, an entrance seal at the forward end of the chamber through which the elongated material enters the chamber, means for introducing into the portion at the forward end of the chamber and for maintaining therein steam under pressure to form in the forward end of the chamber a vulcanizing zone, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, and means for maintaining the chamber at the cooling zone, during operation of the apparatus, substantially filled with condensate derived from the steam in the vulcanizing zone.

10. Apparatus for the continuous vulcanization of elongated vulcanizable material, comprising an elongated chamber, an entrance seal at the forward end of the chamber through which the elongated material enters the chamber, means for introducing into the portion at the forward end of the chamber and for maintaining therein steam under pressure to form in the forward end of the chamber a vulcanizing zone, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, means for maintaining the chamber at the cooling zone, during operation of the apparatus, substantially filled with condensate derived from the steam in the vulcanizing zone, and means to maintain the volume of the condensate in the cooling zone such that the condensate is maintained generally within a predetermined length of the chamber at the cooling zone.

11. Apparatus for the continuous vulcanization of elongated vulcanizable material, comprising an elongated chamber, an entrance seal at the forward end of the chamber through which the elongated material enters the chamber, means for introducing into the portion at the forward end of the chamber and for maintaining therein steam under pressure to form in the forward portion of the chamber a vulcanizing zone, the rear end of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, means for maintaining the chamber at the cooling zone, during operation of the apparatus, substantially filled with condensate derived from the steam in the vulcanizing zone, means to abstract heat from the condensate at the cooling zone, and means to maintain the volume of the condensate in the cooling zone such that the condensate is maintained generally within a predetermined length of the chamber at the cooling zone.

12. Apparatus for the continuous vulcanization of elongated vulcanizable material, comprising an elongated chamber, an entrance seal at the forward end of the chamber through which the elongated material enters the chamber, means for feeding steam under high pressure into the chamber adjacent its forward end, whereby there is created and maintained a vulcanizing zone in the forward portion of the chamber, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, means for maintaining the chamber at the cooling zone, during operation of the apparatus, substantially filled with condensate derived from the steam in the vulcanizing zone, means to abstract heat from the condensate at the cooling zone, and means automatically to maintain the volume of the condensate in the cooling zone such that the condensate is maintained generally within a predetermined length of the chamber at the cooling zone, such last named means comprising means responsive to variations in the volume of condensate in the cooling zone, and a condensate exhaust system operated thereby.

13. Apparatus for the continuous vulcanization of elongated vulcanizable material, comprising an elongated chamber, an entrance seal at the forward end of the chamber through which the elongated material enters the chamber, means for feeding steam under high pressure into the chamber adjacent its forward end, whereby there is created and maintained a vulcanizing zone in the forward portion of the chamber, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, means for maintaining the chamber at the cooling zone, during operation of the apparatus, substantially filled with condensate derived from the steam in the vulcanizing zone, means to abstract heat from the condensate at the cooling zone, and means automatically to maintain the volume of the condensate in the cooling zone such that the condensate is maintained generally within a predetermined length of the chamber at the cooling zone, such last named means comprising means responsive to variations in the level of the condensate in the cooling zone at a location adjacent the rear end of the vulcanizing zone, and a condensate exhaust system operated thereby.

14. Apparatus for the continuous vulcanization of elongated vulcanizable material, comprising an elongated chamber, an entrance seal at the forward end of the chamber through which the elongated material enters the chamber, means for feeding steam under high pressure into the chamber adjacent its forward end, whereby there is created and maintained a vulcanizing zone in the forward portion of the chamber, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, means for maintaining the chamber at the cooling zone, during operation of the apparatus, substantially filled with condensate derived from the steam in the vulcanizing zone, means to abstract heat from the condensate at the cooling zone, and means automatically to maintain the volume of the condensate in the cooling zone such that the condensate is maintained generally within a predetermined length of the chamber at the cooling zone, such last named means comprising a float chamber in communication with the elongated chamber at a location adjacent the rear end of the vulcanizing zone, a float in said float chamber responsive to the level of condensate at said last named location, a condensate exhaust system, and a valve in said exhaust system operated by the float.

15. Apparatus for the continuous vulcanization of elongated vulcanizable material, comprising an elongated chamber, an entrance seal at the forward end of the chamber through which the elongated material enters the chamber, means for feeding steam under high pressure into the chamber adjacent its forward end, whereby there is created and maintained a vulcanizing zone in the forward portion of the chamber, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, means for maintaining the chamber at the cooling zone, during operation of the apparatus, substantially filled with condensate derived from the steam in the vulcanizing zone, means to abstract heat from the condensate at the cooling zone, and means automatically to maintain the volume of the condensate in the cooling zone such that the condensate is maintained generally within a predetermined length of the chamber at the cooling zone, such last named means comprising a thermo-responsive means in the elongated chamber at a location adjacent the rear end of the vulcanizing zone, a condensate exhaust system, and a valve in said exhaust system operated by the thermo-responsive device.

16. The process for the continuous vulcanization of elongated vulcanizable material which comprises passing such elongated vulcanizable material continuously through a vulcanizing zone, subjecting the elongated vulcanizable material to contact with steam under pressure while passing through the vulcanizing zone to vulcanize such material, passing the elongated vulcanizable material continuously and directly from the vulcanizing zone to a cooling zone, such cooling zone being in immediate and constant communication with the vulcanizing zone, maintaining the cooling zone and its contents under pressure derived from the vulcanizing zone, abstracting heat from the exterior of the cooling zone to cause the condensation of steam from the vulcanizing zone in such cooling zone, and during travel of the elongated vulcanizable material through the cooling zone immersing it in the thus formed condensate in the cooling zone.

17. The process for the continuous vulcanization of elongated vulcanizable material which comprises passing such elongated vulcanizable material continuously through a vulcanizing zone, subjecting the elongated vulcanizable material to contact with steam under pressure while passing through the vulcanizing zone to vulcanize such material, passing the elongated vulcanizable material continuously and directly from the vulcanizing zone to a cooling zone, such cooling zone being in immediate and constant communication with the vulcanizing zone, maintaining the cooling zone and its contents under pressure derived from the vulcanizing zone, abstracting heat from the exterior of the cooling zone to cause the condensation of steam from the vulcanizing zone in such cooling zone, maintaining the thus formed condensate predominantly in the cooling zone and in such quantity as substantially to fill the cooling zone, and immersing the vulcanized material in said condensate in the cooling zone.

18. The process for the continuous vulcanization of elongated vulcanizable material which comprises establishing in one part of an elongated container an elongated vulcanizing zone containing steam under high pressure, establishing in another part of such container an elongated cooling zone in direct, pressure-transmitting, communication with, and situated directly adjacent to, the vulcanizing zone, cooling the exterior of the container at the cooling zone to cause the condensation of steam in the container at the cooling zone, maintaining the thus formed condensate predominantly in the cooling zone and in such quantity as substantially to fill the cooling zone, passing the elongated vulcanizable material continuously through the vulcanizing zone, subjecting the material to contact with said steam under pressure while passing through the vulcanizing zone to vulcanize the material, passing the elongated vulcanizable material continuously and directly from the vulcanizing zone to the cooling zone, and immersing the vulcanized material in the aforesaid condensate maintained under pressure in the cooling zone.

19. Apparatus for the continuous vulcanization of elongated vulcanizable material, comprising an elongated substantially horizontal chamber, an entrance seal at the forward end of the chamber through which the elongated material enters the chamber, means for introducing into the portion at the forward end of the chamber and for maintaining therein steam under pressure to form in the forward end of the chamber a vulcanizing zone, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, and means for maintaining the chamber at the cooling zone, during operation of the apparatus, substantially filled with condensate derived from the steam in the vulcanizing zone, said last named means comprising a partial barrier positioned transversely in the chamber at the juncture between the vulcanizing zone and the cooling zone, said partial barrier being imperforate at the top thereof, the partial barrier having an opening therethrough at the bottom thereof somewhat larger than the cross-section of the elongated vulcanizable material to accommodate passage of such material therethrough and to establish direct intercommunication of the fluids within the vulcanizing and cooling zones.

20. Apparatus for the continuous vulcanization of elongated vulcanizable material, comprising an elongated substantially horizontal chamber, an entrance seal at the forward end of the chamber through which the elongated material enters the chamber, means for introducing into the portion at the forward end of the chamber and for maintaining therein steam under pressure to form in the forward end of the chamber a vulcanizing zone, the rear portion of the chamber into which the vulcanized elongated material travels directly from the vulcanizing zone housing a cooling zone, an exit seal at the rear end of the chamber through which the cooled vulcanized elongated material emerfges from the chamber, said chamber throughout its length providing an open passage for the travel of the material therethrough and for the direct communication of the fluids within the vulcanizing and cooling zones with each other, means for maintaining the chamber at the cooling zone, during operation of the apparatus, substantially filled with condensate derived from the steam in the vulcanizing zone, said last named means comprising a partial barrier positioned transversely in the chamber at the juncture between the vulcanizing zone and the cooling zone, said partial barrier being imperforate over the major portion of its area and at the top thereof, the partial barrier having an opening therethrough at the bottom thereof somewhat larger than the cross-section of the elongated vulcanizable material to accommodate passage of such material therethrough and to establish direct intercommunication of the fluids within the vulcanizing and cooling zones, and means to maintain the volume of the condensate in the cooling zone such that the condensate is maintained generally within a predetermined length of the chamber at the cooling zone.

21. Apparatus for the continuous vulcanization of elongated vulcanizable material, comprising an elongated substantially horizontal chamber, an entrance seal at the forward end of the chamber through which the elongated material enters the chamber, means for introducing into the portion at the forward end of the chamber and for maintaining therein steam under pressure to form in the forward portion of the chamber a vulcanizing zone, the rear end of the chamber into which the elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, means for maintaining the chamber at the cooling zone, during operation of the apparatus, substantially filled with condensate derived from the steam in the vulcanizing zone, said last named means comprising a partial barrier positioned transversely in the chamber at the juncture between the vulcanizing zone and the cooling zone, said partial barrier being imperforate over the major portion of its area and at the top thereof, the partial barrier having an opening therethrough at the bottom thereof somewhat larger than the cross-section of the elongated vulcanizable material to accommodate passage of such material therethrough and to establish direct intercommunication of the fluids within the vulcanizing and cooling zones, means to abstract heat from the condensate at the cooling zone, and means to maintain the volume of the condensate in the cooling zone such that the condensate is maintained generally within a predetermined length of the chamber at the cooling zone.

22. Apparatus for the continuous vulcanization of elongated vulcanizable material, comprising an elongated substantially horizontal chamber, an entrance seal at the forward end of the chamber through which the elongated material enters the chamber, means for feeding steam under high pressure into the chamber adjacent its forward end, whereby there is created and maintained a vulcanizing zone in the forward portion of the chamber, the rear portion of the chamber into which the vulcanized elongated material travels directly from the vulcanizing zone housing a cooling zone, an exit seal at the rear end of the chamber through which the cooled vulcanized elongated material emerges from the chamber, said chamber throughout its length providing an open passage for the travel of the material therethrough and for the direct communication of the fluids within the vulcanizing and cooling zones with each other, means for maintaining the chamber at the cooling zone, during operation of the apparatus, substantially filled with condensate derived from the steam in the vulcanizing zone, said last named means comprising a partial barrier positioned transversely in the chamber at the juncture between the vulcanizing zone and the cooling zone, said partial barrier being imperforate over the major portion of its area and at the top thereof, the partial barrier having an opening therethrough at the bottom thereof somewhat larger than the cross-section of the elongated vulcanizable material to accommodate passage of such material therethrough and to establish direct intercommunication of the fluids within the vulcanizing and cooling zones, means to abstract heat from the condensate at the cooling zone, and means automatically to maintain the volume of the condensate in the cooling zone such that the condensate is maintained generally within a predetermined length of the chamber at the cooling zone, such last named means comprising means responsive to variations in the level of the condensate in the cooling zone at the location adjacent the rear end of the vulcanizing zone, and a condensate exhaust system operated thereby.

JUSTIN H. RAMSEY.
JURIAN W. VAN RIPER.

REFERENCES CITED

The following references are of record in the file of this patent:

UNITED STATES PATENTS

| Number | Name | Date |
|---|---|---|
| 2,069,087 | Forstrom et al. | Jan. 26, 1937 |
| 2,509,668 | Berggren | May 30, 1950 |